Aug. 10, 1926.

G. H. SCHIEFERSTEIN 1,595,169

MEANS FOR PRODUCING CURVE SHAPED OSCILLATIONS

Filed May 7, 1924     2 Sheets-Sheet 1

Inventor.

Georg Heinrich Schieferstein

Aug. 10, 1926. 1,595,169
G. H. SCHIEFERSTEIN
MEANS FOR PRODUCING CURVE SHAPED OSCILLATIONS
Filed May 7, 1924  2 Sheets-Sheet 2
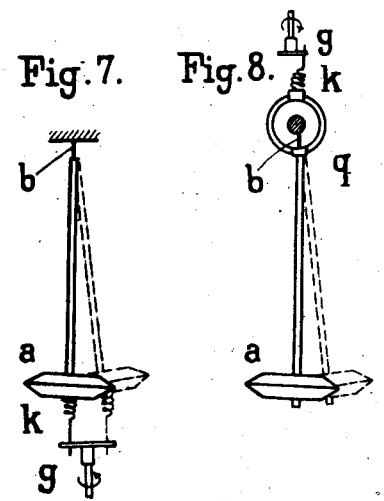
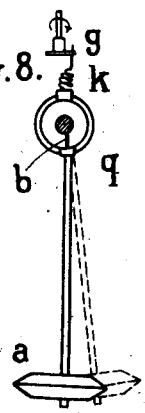
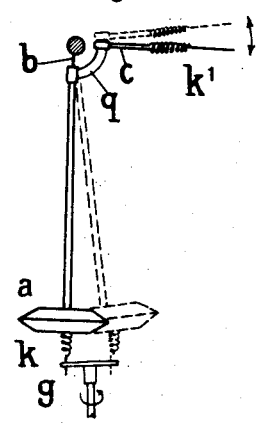
Fig. 7.  Fig. 8.  Fig. 9.
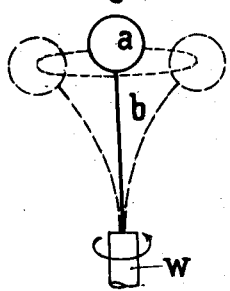
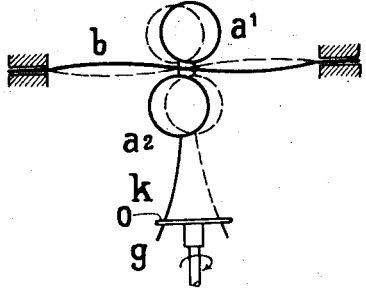
Fig. 10.  Fig. 11.
Fig. 14.
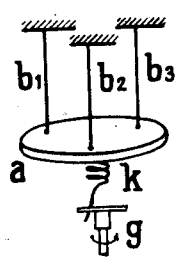
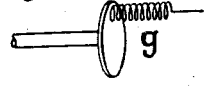
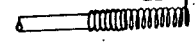
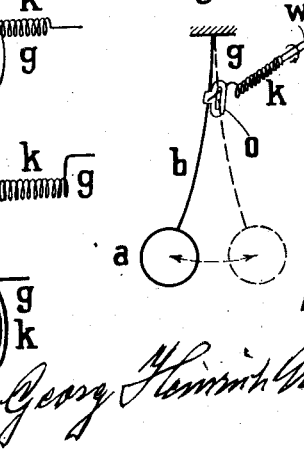
Fig. 12. Fig. 13. Fig. 15.  Fig. 18.
Fig. 16.
Fig. 17.
Inventor:
Georg Heinrich Schieferstein Patented Aug. 10, 1926.

1,595,169

UNITED STATES PATENT OFFICE.

GEORG HEINRICH SCHIEFERSTEIN, OF BERLIN-CHARLOTTENBURG, GERMANY.

MEANS FOR PRODUCING CURVE-SHAPED OSCILLATIONS.

Application filed May 7, 1924, Serial No. 711,736, and in Germany April 19, 1923.

It is well known, that every circular movement can be resolved into two rectangular compulsory reciprocating movements, which follow the sine rule, and vice versa.

The present invention gives the method and the means for composing two or more free elastic oscillations oscillating in a corresponding phase and with variable amplitude into one oscillation which follows a closed curve for example to a circular oscillation with variable amplitude or to reduce such oscillations to two rectangular reciprocating oscillations with variable amplitude. To continuously keep up such oscillations it is essential to use a suitable loose coupling—in systems having a very low damping an extremely loose connection—besides the special construction of the elastical means of the oscillating systems.

Instead of circular oscillations any sort of elliptical oscillations may be obtained using unsymmetrically arranged oscillating systems or such of different dimensions.

The amplitude of the oscillating movements, circular oscillations etc. is absolutely dependent upon the selection of the coupling elastical means used.

Oscillating systems, as pendulums, balance wheels and the like, are only capable of controlling mechanisms moving in equal periods of time, but the circularly oscillating systems in accordance with the present invention may be used for controlling rotating mechanisms for maintaining a rather absolutely constant angular velocity. Such controlling mechanisms may be employed for all sorts of motors, generators and the like to keep up constant speed or to keep them running synchronously, for clocks or other time-measuring devices the hands of which have to run continuously, for talking machines, for telescope-movers etc.

In order that the invention may be clearly understood reference will now be made to the accompanying drawings. All the devices shown in the figures represent an oscillatory system consisting of a mass and elastical means.

Figs. 7, 8 and 9 illustrate different ways of suspending and driving a gyrating weight.

Fig. 10 illustrates a very simple form of gyrating weight.

Fig. 11 illustrates a diaphragm mounting for a pair of weights.

Figs. 12 and 13 illustrate the manner of multiple suspension.

Figs. 14–18 illustrate different forms of flexible cranks.

In all the figures the mass has been marked by the letter $a$, the elastical means by the letter $b$.

In accordance with the present invention every oscillatory system is combined with a loose coupling, connecting the oscillatory system $a$ $b$ with the driving organ. The loose coupling—so far as it has been illustrated in the figures—is marked by the letter $k$. In all figures the driving system—generally a crank-and-pitman—is marked uniformly by $g$ $h$.

Figure 1:
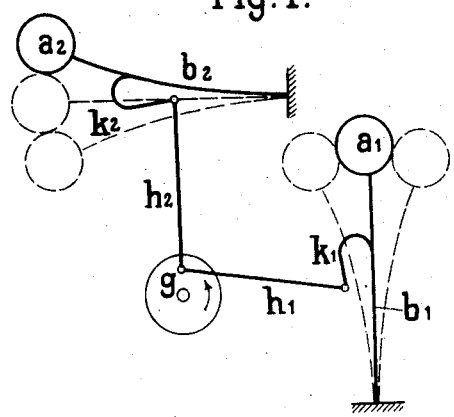
Figure 1 illustrates two weights excited to oscillate in rectangular directions from a single rotary element.

Fig. 1 illustrates two oscillatable mechanisms $a^1$ $b^1$ and $a^2$ $b^2$ connected with the crank gear $g$ $h^1$ and $g$ $h^2$ by a loose coupling $k_1$ $k_2$.

The two oscillatable mechanisms oscillate rectangularly in one and the same plane. These two rectangular oscillations may be combined into one circular oscillation by the crank disk $g$, while on the other hand the two rectangular oscillations can be produced by a rotating movement of the crank $g$.

Oscillatory systems as they are used here having a determined periodicity (natural oscillation) can only be driven i. e. excited in the frequency of their natural period, this ability or necessity postulates that such oscillatory systems have a controlling effect.

Figure 2:
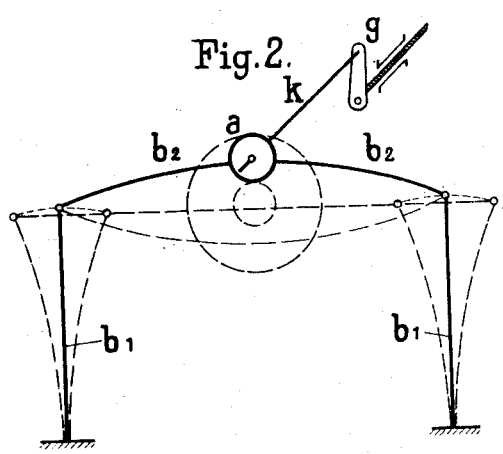
Fig. 2 is a view of a mass or weight oscillating circularly.

The two systems oscillating rectangularly to each other ($b^1\ a\ b^1$ and $b^2\ a\ b^2$) illustrated in Fig. 2 have a mutual mass $a$ which itself oscillates circularly. The elastical means $b_1\ b_1$ of the horizontally oscillating system are fastened at their one end whilst at their other end they bear the elastical means $b_2\ b_2$ of the vertically oscillating system. The mass $a$ of both systems is excited by the crank $g$ the crank pin $k$ being formed of a thin, long, round wire functioning as "loose coupling".

Figure 3:
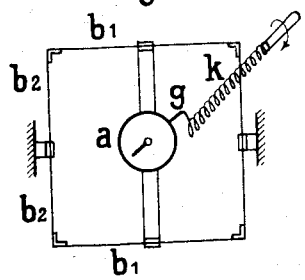
Figs. 3 and 4 illustrate a different manner of supporting a weight oscillating circularly.
Figure 4:
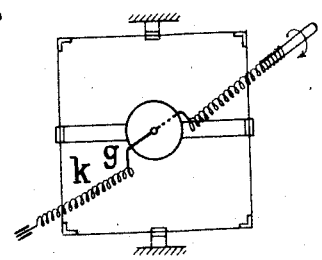

The system illustrated in Fig. 3 consists of the mass $a$ and the rectangularly arranged or bent elastical means $b_1$ and $b_2$. To oscillate circularly the mass of this system is excited by the crank $g$ and the coupling $k$ which also may be arranged symmetrically as illustrated in Fig. 4.

Figure 5:
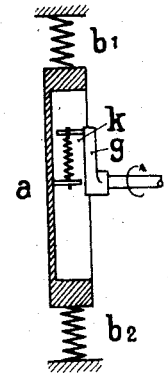
Fig. 5 is a view, partly in section, of a ring-shaped mass radially supported.

Fig. 5 illustrates the section of an oscillatory system consisting of a ring-shaped mass $a$ suspended by any number of elastical means $b_1\ b_2$ symmetrically in a ray shaped form, arranged in one plane. This system in order to oscillate circularly is excited by the coupling $k$ its one end being attached to a pin in the middle of the mass, its other end to the rotating crank $g$.

Figure 6:
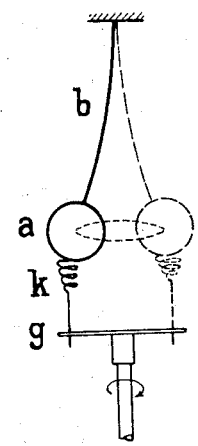
Fig. 6 illustrates a flexible, suspended gyrating weight.

The oscillatory system of Fig. 6 consists of a round steel wire $b$ its one end being fastened, its other free end bearing a mass $a$ this holding a conical wrought thin spring. Also here the basis of the oscillatory system being fixed, the mass $a$ is excited to circular oscillations by the coupling $k$ being moved round by a crank-disc $g$ and being guided in a hole or a slit therein.

Fig. 7 illustrates a pendulum $a$ consisting of rod and bob suspended by an elastical wire $b$ having a circular cross-section. This pendulum is driven by the rotating crank-disc $g$ and is excited to circular oscillations by the loose coupling $k$ operatively connected with the pendulum-bob.

Fig. 8 illustrates such a circularly oscillating pendulum the excitation of which is done by the crank-disc $g$ and the coupling $k$ which does not act on the pendulum-bob, but on the opposite side of the suspending-point on a ring $q$. This ring as well as the pendulum-rod is a part of the mass of the pendulum.

Fig. 9 illustrates a pendulum similar to that shown in Fig. 7 and has a small ring-sector bearing a lever $c$ rectangularly placed to the pendulum-rod. The pendulum $a$ oscillating circularly, the lever $c$ oscillates only in that component of the circular oscillation which lies within the plane of the pendulum when in its rest position. The lever $c$ moves in one plane, performing reciprocating oscillations which are derived from the circular oscillations of the pendulum and fitted for use by the coupling $k$.

A second lever placed rectangularly to the former one (i. e. also rectangular to the plane of the drawing) would move with a difference of phase of 90° in the other component of the circular oscillation.

This device illustrates a transformer of movements, by aid of which a circular oscillation may be resolved into its components or a rotative movement may be transformed into a reciprocating movement. On the other hand the pendulum can be excited to circular oscillations by a reciprocating oscillation for operating the coupling $k$, and then a rotative movement can be obtained, the coupling $k$ operating the crank-disc $g$.

Fig. 10 illustrates the most simple oscillatory system capable of oscillating circularly. It consists of a mass $a$ connected with an elastical means $b$ (steel-wire) arranged in the extension-line of a vertical shaft $w$. At the rotation of this shaft in direction of the arrow or vice versa the mass laterally deflected will follow the rotation of the shaft. In relation to the shaft, rotating with constant angular-velocity the oscillatory system $a\ b$ is in a rest-position. But if the number of revolutions of the shaft will be decreased or if the rotation of the shaft will even be stopped, the system $a\ b$ in oscillating circularly continues to move and by this produces a controlling effect. At a variation of revolutions of the rotating shaft $w$ fluctuations will occur which—depending upon the damping of the system—will come to rest after some time. This system is not so well adapted for controlling purposes as that illustrated by Fig. 6, on account of the coincidence of the oscillations occurring during the variation of the number of revolutions.

The elastic coupling organ $k$ has been illustrated in all figures with exception of Fig. 10. But also here a "coupling" is used, a so called "potential coupling", consisting of the elasticity of the elastical means $b$ near its fastening point.

In Fig. 11 the two weights $a_1\ a_2$ are the mass of the oscillatory system, the elastical means $b$ which may be a diaphragm or a cross or a star shaped metal plate. The end of the coupling $k$ is stuck through a hole or slit $o$ of a rotating disk $g$ for exciting the system $a\ b$. The masses $a_1\ a_2$ execute a tumbling movement.

Fig. 12 illustrates a system consisting of 3 steel wires being fastened at one end and bearing at their other end the mass $a$ with which the coupling $k$ is operatively connected in its centre exciting (by $g$) the system to circular oscillations. Instead of the straight elastical means $b_1\ b_2\ b_3$ wound elastical means (for instance spiral springs Fig. 13) may be used.

To keep moving a pendulum of a clock or an other oscillating controlling system, especially undamped systems they have to be excited by an extremely small amount of energy per oscillation and it was rather difficult to construct coupling-devices capable of transmitting such small amounts of energy and at the same time strong enough not to be too easily damaged.

The method of coupling in such a loose degree, and suitable coupling-devices capable of transmitting even the smallest power of any practical use and on the other hand to answer the demands regarding its solidity represent an essential part of the oscillatory systems used in the present invention.

In Fig. 14: $g$ illustrates a crank-disk, the pin $k$ of which consists of a long, thin, elastic, round wire. The longer the wire, the smaller the amount of energy will be which can be transmitted by such a wire acting as a crank. In this way by using long, but not too thin wires, even smallest amounts of energy can be transmitted.

For the sake of economizing space, as well as by reason of the effect of gravity it is not possible to construct the wire or the crank pin of any length. But there is no difficulty in coiling a very long wire for example in form of a spiral (Figs. 15 and 16).

It is immaterial whether the coupling member $k$ is arranged at the front of the crank disc carrying the crank-pin (Fig. 15) or whether the free end of the wire spiral is bent in the form of the crank $g$ and the other end of the wire spiral is secured on the rotating shaft as shown in Fig. 16.

The coupling member $k$ can also be formed as a flat spiral. (Fig. 17.) Furthermore it is immaterial whether the coupling member $k$ is attached to the driving system and with its free end (Fig. 2) operates the oscillating system or whether it is fastened to the oscillating system and its free end passes into a hole or into a slit of the rotating crank-disc (Fig. 6). In this case the coupling member $k$ has preferably a conical shape, the base of which is connected with the oscillating systems $a\ b$ and its free end is operated by a rotating crank-disc $g$. A further example of the coupling member is shown in Fig. 4. Two wire-spirals are here illustrated, which may be formed cylindrically, conically or as flat spirals, their middle part having the form of a crank and their two ends being held centrally in bearings. On account of the elasticity of the two springs the stroke of such a crank can be increased or decreased according to their load.

A coupling device of the kind described may be characterized as an extremely loose coupling. The application of an extremely loose coupling to one of the oscillating systems corresponding to Fig. 1 is illustrated in Fig. 18, the extreme loose coupling $k$ rotating with the shaft $w$ has on its free end a bent crank $g$, which sticks in a slit $o$ on a guide of the oscillating system $a\ b$. The rotation of the shaft $w$ excites the oscillatory system $a\ b$ into plane oscillations. The excitation of circular oscillations by an extremely loose coupling is for example illustrated by the Figs. 3 and 6.

Claims.

1. A mechanical movement comprising a weight member, resilient means supporting said member flexible in rectangular directions, a rotating driving element, and yielding crank means to connect said member and driving element.

2. A mechanical movement, comprising a weight having a natural period of oscillation, a resilient means for supporting the weight, a rotating driving member rotating substantially in synchronism with the period of said weight, and a resilient driving connection between said member and weight.

3. A mechanical movement, comprising a resiliently supported weight having a natural period of oscillation, a rotating driving element to set the weight in oscillation, and a spring between said rotating element and weight, said spring being arranged excentrically to said element.

4. A mechanical movement, comprising a system including a weight and a resilient means for supporting said weight, and a yielding crank for driving said weight.

5. A mechanical movement, comprising a weight member, a plurality of elastic elements supporting the same, a rotating driving means and a resilient device excentric to said driving means and connected to said member, said means and member rotating substantially in synchronism.

6. A mechanical movement, comprising a weight member, a plurality of springs spaced apart and supporting said member, a rotating driving means, and a spring connecting said means and member.

7. A mechanical movement, comprising a weight member, a plurality of yielding, flexible elements supporting said member, a rotating driving member, a spring connecting the members, said spring excentrically disposed to one of said members, and concentric to the other member.

8. A mechanical movement, comprising a weight member, yielding, resilient supports for said member, said supports deflectable in rectangular directions, a rotating driving member and a yielding connection between the members excentric to said driving member.

9. A mechanical movement, comprising a weight member, elastic devices supporting said member and exerting their elasticity in rectangular directions, a rotating driving member, and an elastic, excentric driving connection between said members.

10. A mechanical movement, comprising a driven member, elastic devices supporting said member for gyration, a rotating member, a coil spring connecting the driven member and rotating member and excentric to one of them.

11. A mechanical movement, comprising a driven member, springs supporting said member and flexible in rectangular directions to effect circular translation of the member, a rotating driving member and a coil spring connecting the members and excentric to one of them.

In testimony whereof I affix my signature.

GEORG HEINRICH SCHIEFERSTEIN.